March 23, 1937.   H. C. BOWEN   2,074,361
EQUALIZED HYDRAULIC BRAKE
Filed Jan. 14, 1932   3 Sheets-Sheet 1

March 23, 1937.    H. C. BOWEN    2,074,361
EQUALIZED HYDRAULIC BRAKE
Filed Jan. 14, 1932    3 Sheets-Sheet 2

March 23, 1937.  H. C. BOWEN  2,074,361
EQUALIZED HYDRAULIC BRAKE
Filed Jan. 14, 1932  3 Sheets-Sheet 3

Inventor
Herbert C. Bowen.
By:
Williams, Bradbury,
McCaleb & Hinkle,
Attys.

Patented Mar. 23, 1937

2,074,361

UNITED STATES PATENT OFFICE 2,074,361

EQUALIZED HYDRAULIC BRAKE

Herbert C. Bowen, Detroit, Mich., assignor to Hydraulic Brake Company, Detroit, Mich., a corporation of California Application January 14, 1932, Serial No. 586,474

12 Claims. (Cl. 60—54.5)

My invention pertains to hydraulic brakes and is more particularly concerned with an equalized type of hydraulic brake system wherein separate conduits connect separate compression cylinders with separate braking elements.

In the past it has been proposed, particularly in connection with automotive vehicles, to use hydraulic brake systems in which two separate hydraulic brake layouts were operated from a single pedal, one layout applying the brakes to the front wheels of the vehicle and the other layout applying the brakes to the rear wheels of the vehicle. This arrangement had the disadvantage that the pressures in the two layouts were not always equal and that unequal braking connection was obtained on the two sets of wheels.

An object of my invention is to provide such a system in which the pressures in the two layouts will be maintained equal as long as both layouts are in operating condition.

Another object of my invention is to provide such a hydraulic brake system in which a failure of one conduit system will not interfere with the successful operation of the brakes applied by the other conduit system.

Another object is to provide an equalized hydraulic brake system which utilizes the pressure existing in the low pressure conduit to operate means to connect this low pressure conduit with the high pressure conduit.

Another object is to provide an equalized hydraulic brake system in which the equalizing mechanism will function throughout a predetermined range of pressure ratios between the two conduits.

Another object is to provide improved equalizing means for such a system.

Another object is to provide a new and improved reservoir for reserve fluid.

Another object is to provide an equalized hydraulic brake system which will be economical to manufacture and which will be sturdy and reliable in service.

Other objects and advantages will appear as the description proceeds.

Figure 4:
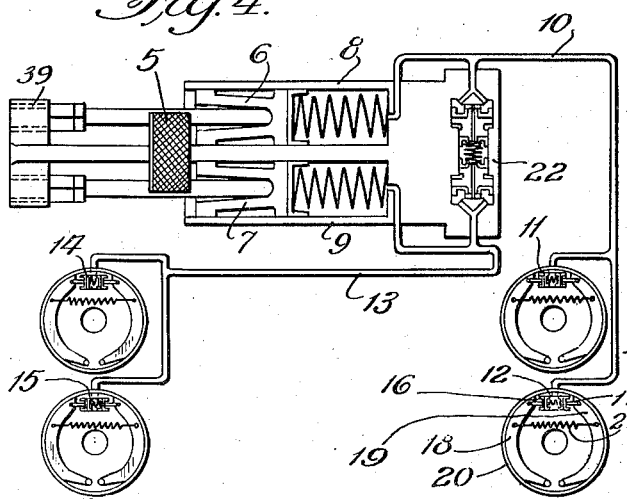
Figure 4 is a diagrammatic view illustrating the entire system.

Referring to the drawings, and more particularly to Fig. 4 thereof, I have illustrated my invention as applied to a hydraulic brake system wherein a manually operated pedal 5 is connected by suitable linkage to pistons 6 and 7 located respectively in cylinders 8 and 9. The cylinder 8 is connected to a discharge conduit 10 leading to motor cylinders 11 and 12 which for present purposes may be considered as located at the rear wheels of an automotive vehicle. The cylinder 9 is connected with a conduit 13 leading to motor cylinders 14 and 15 which may be considered as located at the front wheels of the vehicle. Each motor cylinder contains opposed pistons 16 and 17 which operate brake shoes 18 and 19 to move them into engagement with brake drums 20. The brake shoes are provided with the usual retractile springs 21.

From the foregoing it will be apparent that there is an operating layout consisting of piston 6, cylinder 8, conduit 10 and motor cylinders 11 and 12 for operating the braking elements associated with the rear wheels of the vehicle; and a separate layout consisting of the piston 7, compression cylinder 9, conduit 13, and motor cylinders 14 and 15 for operating the braking elements associated with the front wheels of the vehicle. Insofar as described the only connection between the two layouts is the mechanical connection which results from the fact that both layouts are operated by the same pedal and this fact alone is not sufficient to maintain the proper operating relationship between the two layouts. I therefore find it desirable to connect the conduits 10 and 13 by my new and improved equalizers indicated generally by the reference character 22.

Figure 3:
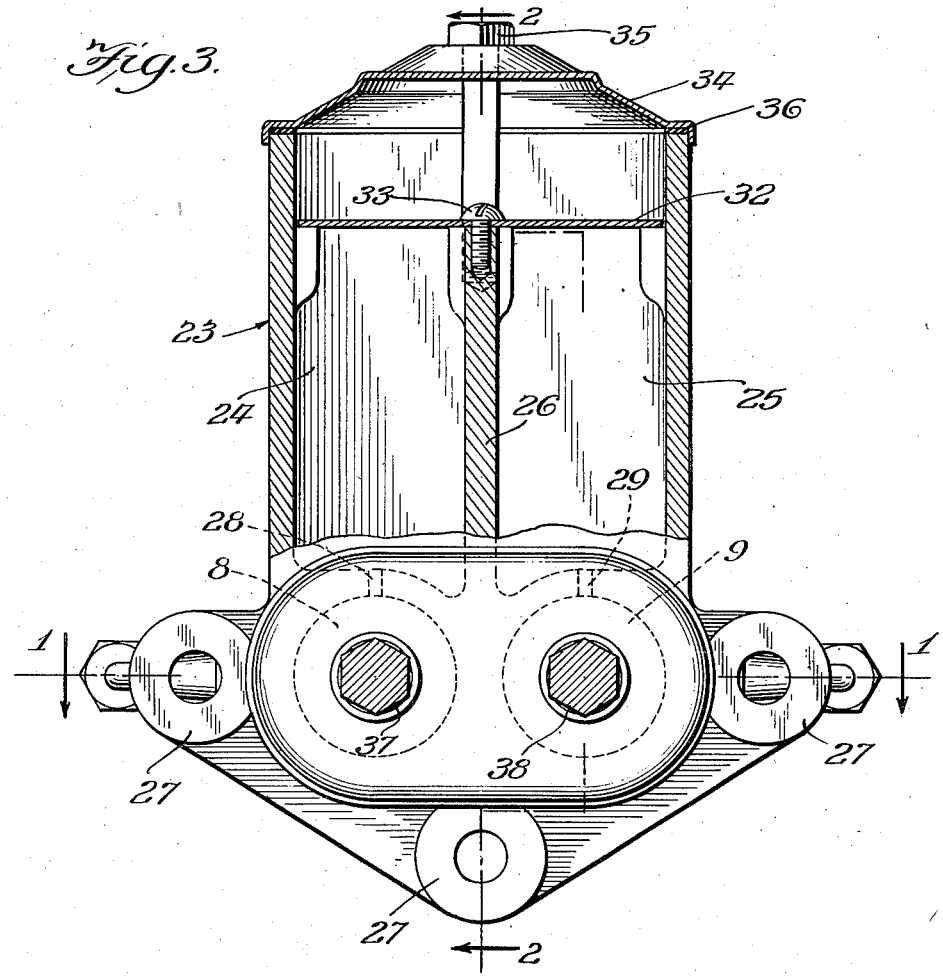
Figure 3 is a vertical section of the compressor, equalizer and reservoir unit taken on the line 3—3 of Figure 2.

In order to provide a system which is as compact as possible I have shown the cylinders 8 and 9 as formed in a single casting. This casting has a rearward extension in which is located the equalizer 22, and the vertical walls of the casting extend upwardly to provide a reservoir indicated generally by the reference numeral 23. As shown most clearly in Figure 3, the reservoir 23 is divided into sub-reservoirs 24 and 25 by a partition 26 which, as illustrated, forms an integral part of this same casting. This casting is further provided with lugs 27 by means of which the casting and mechanism supported thereby may be attached to the frame of the automotive vehicle.

The cylinder 8 is provided with a port 28 leading to the sub-reservoir 24 and the cylinder 9 is provided with a similar port 29 leading to the sub-reservoir 25. These ports 28 and 29 are so located that they are just in front of the rubber cups 30 and 31 associated with the pistons 6 and 7 respectively when the pistons and cups are in their normal or fully retracted position, so that the cylinders 8 and 9 are normally in communication with their sub-reservoirs 24 and 25 respectively. The upper ends of the sub-reservoirs 24 and 25 are almost closed by a horizontal plate 32 secured to partition 26 by screws 33. The edges of the plate 32 however are just short of the walls of the reservoir so that fluid which is poured into the top of the reservoir can flow past the edges of the plate 32 and thence into sub-reservoirs 24 and 25. The top of the reservoir is closed by a cover 34 secured in place by bolts 35 and provided with a vent 36' which maintains the fluid in the reservoir under atmospheric pressure. This vent is preferably so located as to permit the entry of the minimum amount of dirt and moisture into the reservoir, and where it is desired or found necessary this vent may be supplanted by valve mechanism of the type disclosed in United States Patent No. 1,758,671. A gasket 36 may be interposed between the cover 34 and top of the reservoir to provide a tight seal therebetween. The plate 32 serves as an anti-splash means to prevent fluid in one sub-reservoir from splashing over into the other sub-reservoir.

The pistons 6 and 7 are separably connected with and operated by the adjacent ends of piston rods 37 and 38. The other ends of the piston rods 37 and 38 are adjustably connected by screw threads or other suitable means with a cross member 39 connected to the operating pedal 5.

Springs 40 and 41 are interposed between pistons 6 and 7 and valve mechanisms 42 and 43, the latter being shown as of the type disclosed in the copending application of Erwin F. Loweke, Serial No. 472,666, filed August 2, 1930, now Patent No. 1,985,936. The springs 40 and 41 return the pistons 6 and 7 and their associated cups 30 and 31 to normal retracted position. The pistons 6 and 7 are of the type shown in United States Patent No. 1,764,179, and are provided with fluid sealing chambers 44 and 45 to prevent the entry of air into the cylinders 8 and 9. The exposed ends of the pistons 6 and 7 are protected against dirt and moisture by a flexible boot 46 of rubber or other suitable material.

The discharge end of the cylinder 8 communicates with a port 47 which leads to a threaded opening in which is located a suitable fitting 48 for connecting one end of the conduit 10 with the cylinder 8. The conduit 10, which is in reality a conduit system connecting the compression cylinder 8 with the motor cylinders 11 and 12, includes an elbow portion 49 connecting fitting 48 with a T-fitting 50. The T-fitting 50 and associated parts connect the conduit 10 with a plug 51 screwed into the casting containing the cylinders 8 and 9. The plug 51 has a central passageway 52 which divides to form passageways 53 and 54 leading to a cylinder 55. The enlarged end 56 of a piston 57 is located in the cylinder 55 and carries a flexible annular sealing member 58. The smaller end 59 of the piston 57 is located in an intermediate cylinder 60 of smaller diameter than the cylinder 55. This end 59 carries a flexible annular sealing member 61 which receives the thrust of a spring 62 which tends to maintain the piston 57 in the position shown with its projection 63 held in sealing engagement with a gasket 64 carried by the plug 51. The piston 57 has a fluid passageway 65 which is reduced at one end as indicated at 66.

The discharge end of the cylinder 9 communicates with a port 67 which leads to a threaded opening in which is located a suitable fitting 68 for connecting one end of the conduit 13 with the cylinder 9. The conduit 13, or more properly, the conduit system 13, includes an elbow portion 69 connecting fitting 68 with T-fitting 70. The T-fitting 70 and associated parts connect the conduit 13 with plug 71 screwed into the casting containing the cylinders 8 and 9. The plug 71 has a central passageway 72 which divides to form passageways 73 and 74 leading to a cylinder 75 which is of the same diameter as the cylinder 55 previously described. The enlarged end 76 of a piston 77 is located in the cylinder 75 and carries a flexible annular sealing member 78. The smaller end 79 of the piston 77 is located in the cylinder 60 and carries a flexible annular sealing member 80 which receives the thrust of a spring 62 which tends to maintain the piston 77 in the position shown, with its projection 81 held in sealing engagement with the gasket 82 carried by the plug 71. The piston 77 has a fluid passageway 83 which is reduced at one end as indicated at 84. The cylinder 60 is preferably provided with a bleeder screw 85 by means of which air may be bled from the equalizing mechanism.

My new and improved equalized hydraulic brake system is so designed that a break in either the conduit system 10 or the conduit system 13 will render the equalizing mechanism inoperative and will permit the other conduit system and the compressor mechanism and motor cylinders connected therewith to function normally. To this end I have so designed my equalizer mechanism that in order for this equalizer mechanism to function to equalize the pressures in the two conduit systems the pressure in the low pressure conduit system must be sufficiently great to bear a predetermined relationship to the pressure in the high pressure conduit system. This relationship is determined when the system is designed and is dependent upon the ratio between the area of the cylinder 60 and the area of the cylinder 55. As previously explained, the cylinder 75 is given the same area as the cylinder 55. These areas are selected to give the desired ratio and in so selecting these areas the force exerted by the spring 62 is taken into account.

In one embodiment of my invention I have found it desirable to construct the apparatus so that the pressure in the low pressure conduit must be at least half as great as the pressure in the high pressure conduit in order for the equalizer mechanism to operate. In this embodiment the area of the cylinder 60 is made slightly less than half the area of the cylinder 55, the reason for making the area of the cylinder 60 less than half the area of the cylinder 55 being to compensate for the force exerted by the spring 62. If, in this particular embodiment, the pressure in the conduit system 10 rises immediately to 60 lbs. per square inch upon actuation of the pedal, whereas the pressure in the conduit system 13 rises only to 40 lbs. per square inch, the equalizer mechanism will function to permit the flow of fluid from the conduit system 10 into the conduit system 13 and thereby equalize the pressures in the two conduit systems. In this operation of the equalizer mechanism the enlarged end 56 of the piston 57 is subjected to the pressure of 60 lbs. per square inch existing in the conduit system 10 whereupon the piston 57 is moved downwardly as viewed in Fig. 1, thereby moving the extension 63 away from the sealing washer 64 and permitting fluid to flow from cylinder 55 through passageways 65 and 66 into cylinder 60. The piston 57 continues to move downwardly until the lower end of the enlarged part 56 abuts the shoulder formed at the junction between cylinders 55 and 60 whereupon the piston 57 comes to rest.

The pressure in the cylinder 60 is now 60 lbs. per square inch, that is, the same pressure as exists in the conduit system 10. The small end of piston 77 is thus subjected to this 60 lbs. pressure and also the light pressure of the spring 62, whereas the large end of this piston is subjected to the 40 lbs. pressure existing in the conduit system 13. As previously explained, the force exerted by the spring 62 may be disregarded. The effective pressure acting on the small end of the piston 77 to hold it in the position shown would be sixty times one-half or 30 lbs. if we consider the small end of the piston to have an area of one-half square inch, whereas the force acting on the large end of the piston 77 is forty times one or 40 lbs. if we consider the large end of the piston to have an area of one square inch. Thus there is an unbalanced force of 10 lbs. acting to move the piston 77 upwardly as viewed in Fig. 1. This force moves the piston upwardly until the shoulder formed by the upper end of the large portion of the piston seats against the shoulder formed at the juncture between cylinders 60 and 75 whereupon the piston comes to rest. As soon as the extension 81 moves away from the gasket 82 fluid can flow from cylinder 60 through passageways 84 and 83 into cylinder 75 and from there to conduit system 13, and since cylinder 60 is already in communication with conduit system 10 a direct connection is established between conduit system 10 and conduit system 13 so that fluid can flow from conduit system 10 into conduit system 13 and equalize the pressures in the two systems.

Figure 1:
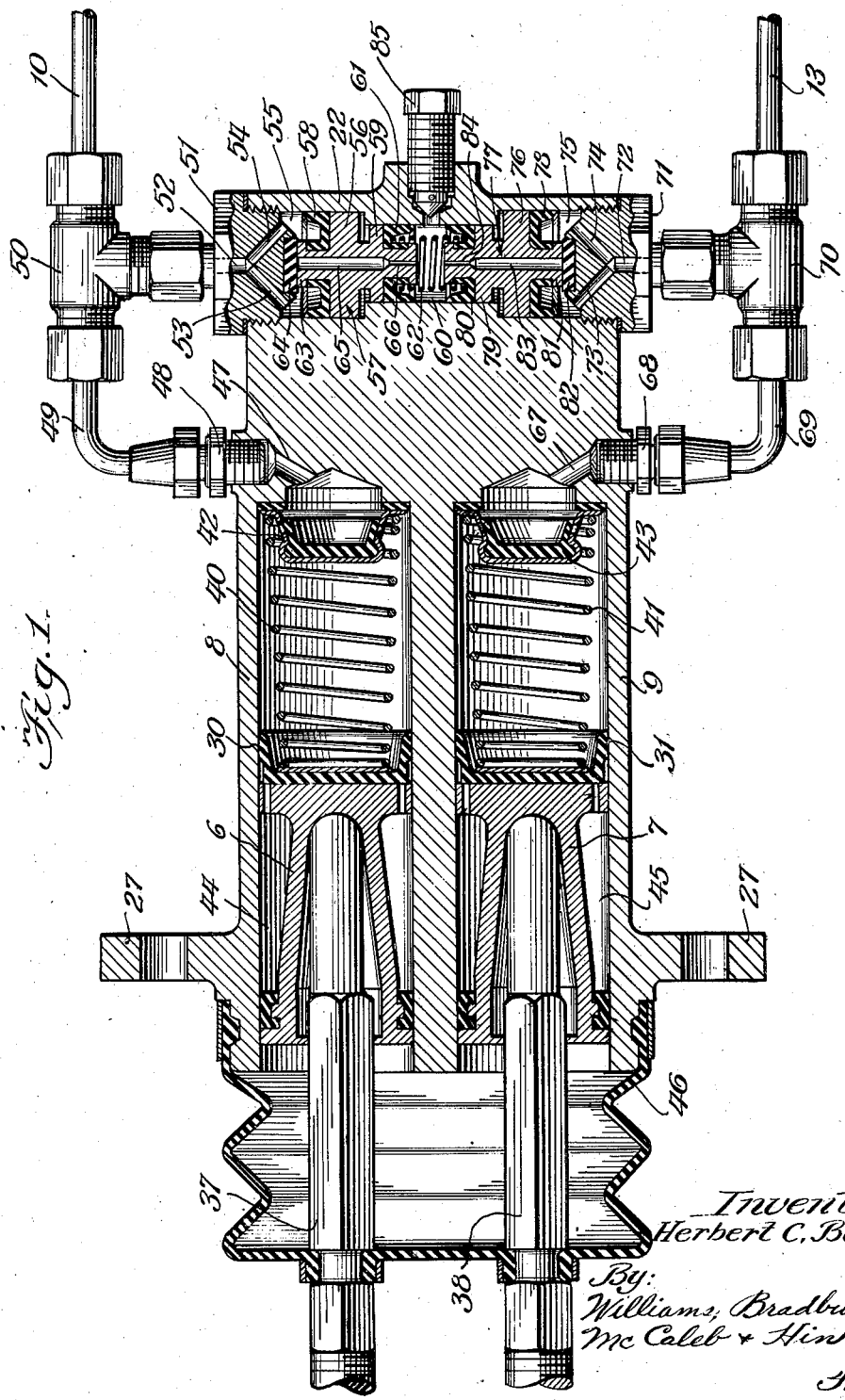
Figure 1 is a horizontal section through the compressor, equalizer and reservoir unit of my new and improved system, and is taken on the line 1—1 of Figure 3.
Figure 2:
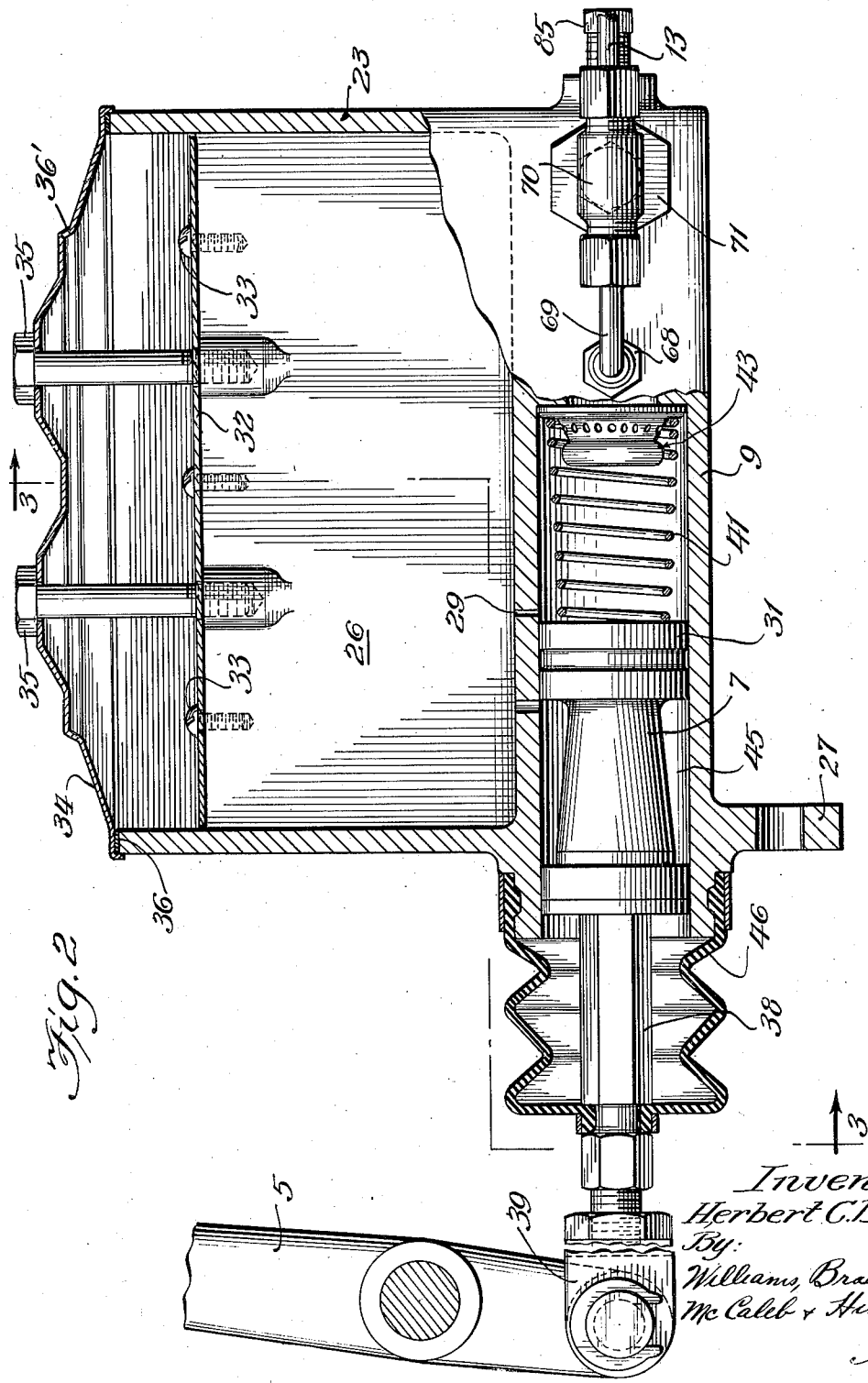
Figure 2 is an elevation partly in section of the compressor and equalizer unit of Figure 1; this figure is taken on the line 2—2 of Figure 3 except that one corner of the device is shown in elevation for the purpose of more clearly illustrating the piping arrangement.

If the pressure in conduit system 13 had been only 20 lbs. per square inch instead of 40 lbs. per square inch, piston 77 would have remained in the position shown in Fig. 1 of the drawings since the force acting on its large end would have been 20 times one or 20 lbs. whereas the force acting on its small end would have been 30 lbs. and the piston would not have moved away from the washer 82 but would have been urged thereagainst by a force of 10 lbs. acting downwardly on the piston.

In the normal operation of the brake system where the pressures developed in the conduit systems 10 and 13 by their respective pistons 6 and 7 are substantially equal, the pistons 57 and 77 are moved away from their respective gaskets 64 and 82 as soon as pressure is applied to the brake system and said pistons remain separated from said gaskets until pressure on the system is relieved. It is possible that a relatively large leak might occur in one of the conduit systems while the pistons 57 and 77 are away from their respective gaskets, that is, while there is an open connection through the equalizer mechanism through which fluid can flow from one conduit system to the other. I accordingly make the passageways 66 and 84 relatively small so that the fluid can flow therethrough only at a comparatively slow rate. This slow rate of flow is insufficient to maintain pressure in a conduit system which has a fast leak and therefore the pressure in the conduit system with the large leak will drop and the piston 57 or 77 which is held open by the pressure in such leaking conduit system will return to the position shown in Fig. 1 and cut off communication between the two conduit systems. The pressure in the good conduit system is thus preserved and the brakes connected therewith will function perfectly in spite of the leak in the other conduit system, and the resultant failure or ineffective operation of the brakes connected to the leaking conduit system.

When it is desired to bleed the cylinders and conduit systems of any air which may have worked its way thereinto the bleeder screw 85 is unscrewed one or two turns and the pedal actuated to cause the pistons 6 and 7 to discharge fluid into the conduit systems. The air in the equalizer mechanism will thereupon be discharged through the bleeder screw 85 and as soon as fluid free from air comes out of the bleeder screw 85 this screw may be returned to normal sealed position. In accordance with the usual practice the motor cylinders are provided with similar bleed screws whereby any air existing in the conduit systems or motor cylinders may bleed therethrough.

While I have illustrated a single embodiment of my invention it is to be understood that my invention is not limited to the details of the disclosure herein but may be incorporated in numerous modifications thereof and that the scope of my invention is limited solely by the following claims.

I claim:

1. In a hydraulic brake system of the class described, the combination of a compression cylinder, a motor cylinder, a conduit connecting said cylinders, a second compression cylinder, a second motor cylinder, a second conduit connecting said second cylinders, said compression cylinders being operable to create fluid pressure in said conduits and motor cylinders, an equalizing mechanism connecting said conduits for fluid communication therebetween, said mechanism including a pair of valves controlling communication between said conduits, each valve having opposing surfaces of different area adapted for exposure to fluid pressure, and fluid supply means for said compression cylinders.

2. In mechanism of the class described, the combination of compressing means, motor means, a conduit connecting said means, a second compressing means, a second motor means, a second conduit connecting said second means, said compressing means being operable to create fluid pressure in said conduits and motor means, an equalizing mechanism connecting said conduits for fluid communication therebetween, said mechanism including a pair of valves for controlling communication between said conduits, each valve having opposed surfaces of different area adapted for exposure to fluid pressure, seats for said valves, and means normally holding said valves against said seats.

3. In a hydraulic brake system of the class described, the combination of a casting providing two cylinders and a reservoir, there being a port connecting each cylinder with said reservoir, a partition in said reservoir, said partition being located between said ports, a cover for said reservoir spaced above the top of said partition, and antisplash means mounted on said partition substantially to prevent transfer of liquid from one side of said partition to the other side thereof.

4. An equalizer for a fluid system of the class described comprising two large cylinders, a smaller cylinder interposed therebetween, a differential piston having one end in one of said large cylnders and another end in said smaller cylinder, a second piston having one end in the other large cylinder and a second end in said smaller cylinder, there being conduit means for establishing communication between said cylinders, and valve means controlled by said pistons.

5. In mechanism of the class described, the combination of a first compressing means, a first motor means, a conduit connecting said means, a second compressing means, a second motor means, a second conduit connecting said second means, an equalizer mechanism connecting said conduits, and flow restricting means in said equalizer mechanism.

6. In mechanism of the class described, the combination of a first compressing means, a first motor means, a conduit connecting said means, a second compressing means, a second motor means, a conduit connecting said second means, an equalizer mechanism for establishing fluid communication between said conduits, means actuated by the difference in pressure in said conduits for rendering said equalizer mechanism inoperative when the pressure difference between said conduits exceeds a predetermined amount, means for operating said compressing means, and elements operated by said motor means.

7. In a hydraulic brake system of the class described, the combination of a first compressing means, a second compressing means, a fluid reservoir, there being a port connecting each compressing means with said reservoir, a partition in said reservoir, said partition being located between said ports, and an antisplash plate carried by said partition and extending almost to the walls of said reservoir.

8. In mechanism of the class described, an equalizer comprising two large and one small cylinder, a piston in each of said large cylinders, each piston having a part extending into said small cylinder, said pistons providing passageways therethrough, means for closing said passageways, and bleeding means associated with one of said cylinders.

9. In a system of the class described, an equalizer mechanism including two large cylinders, a small cylinder connecting said large cylinders, a piston in each of said large cylinders, said pistons having restricted passageways therethrough, closure means for said passageways, said pistons being reciprocable, and means biasing said pistons towards said closure means.

10. In mechanism of the class described, the combination of a first compressing means, a first motor means, a conduit connecting said means, a second compressing means, a second motor means, a second conduit connecting said means, an equalizer mechanism connecting said conduits, flow restricting means in said equalizer mechanism, and fluid pressure valve means controlling said last-named means.

11. In a fluid pressure system of the class described, the combination of a pair of compression cylinders, a pair of motor cylinders, a conduit connecting each compression cylinder with one motor cylinder, a pressure difference control means connecting said conduits and providing for limited flow therebetween upon the creation of certain predetermined conditions, said last-named means including a differential valve having opposed surfaces of different areas, one surface being exposed to the pressure created in one of said conduits and the other surface being exposed to the pressure created in the other of said conduits.

12. In a hydraulic brake system of the class described, the combination of a first compressing means, a second compressing means, a fluid reservoir having a bottom and side walls, there being a port connecting each compressing means with said reservoir, a partition in said reservoir, said partition being located between said ports, projections on said side walls, and antisplash means for said reservoir, said antisplash means compising a plate of slightly less area than the interior of said reservoir and resting on said partition and projections.

HERBERT C. BOWEN.